(12) United States Patent
Botzer et al.

(10) Patent No.: US 7,266,571 B2
(45) Date of Patent: Sep. 4, 2007

(54) METHOD AND SYSTEM FOR SCHEDULING A PARTIAL ORDERED TRANSACTIONS FOR EVENT CORRELATION

(75) Inventors: David Botzer, Haifa (IL); Vladimir Shcherbina, Nesher (IL); Boris Shulman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 10/899,783

(22) Filed: Jul. 27, 2004

(65) Prior Publication Data

US 2006/0026130 A1 Feb. 2, 2006

(51) Int. Cl.
G06F 17/30 (2006.01)
(52) U.S. Cl. ............... 707/200; 707/2; 707/4; 707/202; 707/204; 707/203
(58) Field of Classification Search ............. 707/2–4, 707/10; 705/14, 26–27; 345/440
See application file for complete search history.

(56) References Cited

U.S. PATENT DOCUMENTS 5,201,044 A * 4/1993 Frey et al. ............... 714/20
5,504,900 A * 4/1996 Raz ......................... 707/10
6,237,001 B1 * 5/2001 Bamford et al. ......... 707/100
6,272,515 B1 8/2001 Fouquet
6,604,093 B1 8/2003 Etzion et al.
6,725,287 B1 * 4/2004 Loeb et al. ............... 710/8
7,023,440 B1 * 4/2006 Havekost et al. ........ 345/440

OTHER PUBLICATIONS

P.A. Bernstein et al., "Timestamp-Based algorithms for concurrency control in distributed database", Proceedings of Sixth International Conference on Very Large Data Bases, 1980.
D. Georgakopoulos et al., Chronological Scheduling of Transactoins with Temporal Dependencies:, VLDB Jorunal 3, 1-28, (1994).

* cited by examiner

*Primary Examiner*—Cam Y T Truong

(57) ABSTRACT

A method and system for scheduling event transactions each having a respective time stamp, for use in an event-driven application. Possible time dependencies among events are resolved according to predetermined event rules associated with the events so as to allow determination as to when the event transactions may be processed. This allows the event transactions to be dispatched to distributed processors for concurrent processing.

1 Claim, 5 Drawing Sheets

US 7,266,571 B2

METHOD AND SYSTEM FOR SCHEDULING A PARTIAL ORDERED TRANSACTIONS FOR EVENT CORRELATION

FIELD OF THE INVENTION

This invention relates to event-driven systems and, in particular, to a method for ensuring the parallel processing of events, which are partially time-dependent, in the distributed environment.

BACKGROUND OF THE INVENTION

Reactive applications relate to a class of applications that are event-driven and configured to operate upon detection of events. The exact timing and content of such events are not usually known in advance. Many tools in different areas have been built to detect events, and to couple their detection with appropriate actions. These tools exist in products that implement active databases, event management systems, the "publish/subscribe" mechanism, real-time systems and similar products.

U.S. Pat. No. 6,604,093 (Etzion et al.) issued Aug. 5, 2003 and entitled "Situation awareness system" is incorporated herein by reference and discloses a configurable event driven rules-based system for processing events in sequential order. Throughout the remainder of this document, this system will be referred to by its acronym "AMIT" meaning "Active Middleware Technology." AMIT is a trademark of International Business Machines Inc. of Armonk, N.Y., USA. That is, incoming events are processed one by one, while all relations (both temporal and quantitative) among different events' instances are kept in memory. While this approach is absolutely necessary for the case, where most of the events have temporal relations (e.g. a specific event's sequence occurs within some specified period of time), it will be not scalable for other cases, where a huge number of temporally independent events should be processed in the distributed environment (e.g. aggregation event rules, where the order of single event instances are less important then their calculated statistical metrics). Also, if AMIT event rules (event combinations) include database queries, then the ACID transaction support should be added.

U.S. Pat. No. 6,272,515 (Fouquet) issued Aug. 7, 2001 and entitled "Method of scheduling distributed transactions" is incorporated herein by reference and discloses a method of scheduling distributed transactions for a transactional monitor with the possibility of parallel initiation of transactions in order to serialize activation of the operations of the transactions in accordance with the chronological order in which the transactions are initiated and allowing for conflicts of execution among operations of different transactions or of the same transaction. Thus, while such method is applicable to conventional transactions that can be divided into elementary operations and events signal only a transaction initiation or an operation termination, such an approach is not suitable for those rule engines that detect pre-defined events combinations (event driven rules) for subsequent processing in distributed transaction environments.

In such case, an event driven rule engine handles every event instance as an atomic transaction that cannot be further divided to composite operations. Such a transaction should lock a resource that is specific for the handled event instance. The resource is a data structure that represents a computational window, which is a time period, where the event instance can be accounted and where a predefined event's combination (rule) can occur. In case of temporal and other semantic dependencies among incoming events, there are possible conflicts among different distributed transactions that should be resolved.

SUMMARY OF THE INVENTION

It is therefore an object of the invention to provide an improved method and system for the parallel processing in a distributed, transaction-oriented environment of event transactions having event-driven rules defining events that are semantically related, where the order of the constituent events can be important.

This object is realized in accordance with a broad aspect of the invention by a method for scheduling event transactions each having a respective time stamp, for use in an event-driven application having predetermined event rules, said method comprising:

resolving possible time dependencies among events according to said predetermined event rules; and determining when the event transactions may be processed thus allowing the event transactions to be dispatched to distributed processors for concurrent processing.

The invention also contemplates a system that implements the method of the invention. Preferably, such a system is an event receiver and conveyor that detects pre-defined event combinations and comprises:

an event transaction for receiving one or more events;

an event concurrency control unit coupled to the event transaction and responsive to respective time stamps associated with said events for resolving possible time dependencies among events according to associated event rules; and at least two output ports of the event concurrency control unit being adapted to be coupled to respective distributed processors for executing said events in parallel, according to dependencies that are learned from said event rule definitions.

Thus, the present invention defines transactions that suit the event rule giving rise to a situation in event driven rules engines, and defines a concurrency control mechanism for such transactions.

Processing the transactions concurrently rather than sequentially requires the transactions to be distributed between several event processing units.

The event concurrency control unit centrally executes a concurrency control algorithm using a single machine and dispatches transactions that are ready to run, i.e. all transactions that were supposed to be executed before the current transaction finished executing, to different processing units. The processing units can be different processes on different machines or different processes (threads) on a single machine using remote procedure calls (RPC). The invention was developed for AMIT, but can be easily applied to the whole class of event driven rule engines operating in distributed environments.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
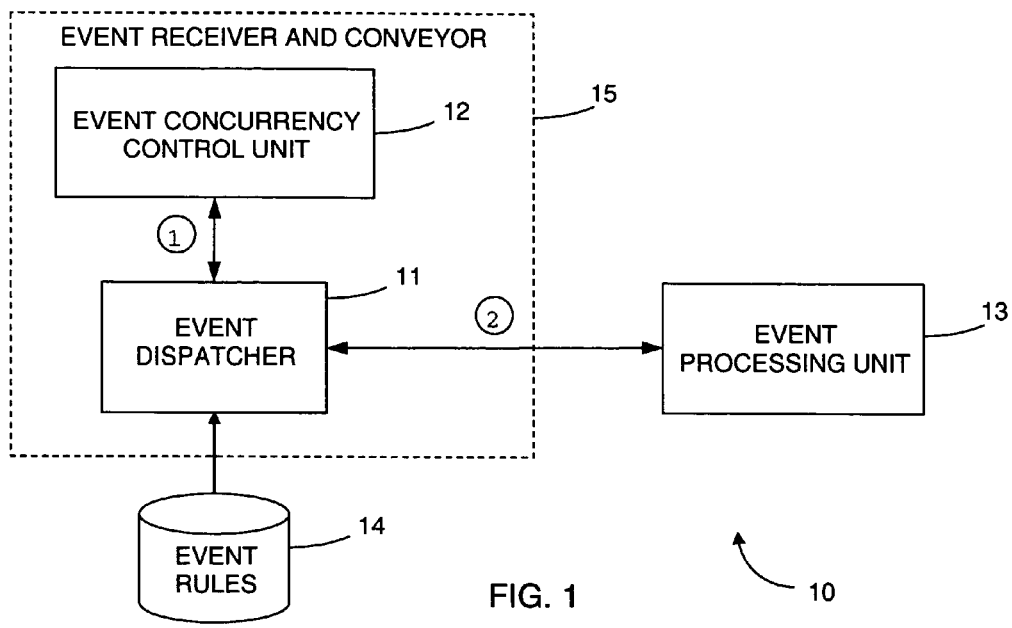
FIG. 1 is a block diagram showing schematically a system according to a first embodiment of the invention for detecting and processing events according to pre-defined event combinations (rules)

FIG. 1 is a block diagram showing schematically a system 10 according to a first embodiment of the invention for detecting and processing events according to pre-defined event combinations (rules). An event dispatcher 11 conveys events sequentially to an event concurrency control unit 12 according to a timestamp associated with each event, and an event processing unit 13 starts event processing for each event. The event processing unit 13 can be any conventional event transaction processor such as AMIT described in above-referenced U.S. Pat. No. 6,604,093. The event concurrency control unit 12 employs a timestamp based concurrency control algorithm (described below) that uses the semantic knowledge of event rules in order to process concurrently incoming events. It checks if event transaction can be started according to the current event rules and suspends the transaction's execution if necessary. It also commits or aborts already running event transactions in the case that their corresponding events were defined for complex (nested) event combinations, which were derived from other event combinations and elementary events.

The event rules may be stored in an external database 14 or in a data file that is accessed by the event dispatcher 11 in an analogous manner to the way in which events and rules are conventionally fed to AMIT. However, whereas the events are conventionally fed to AMIT directly, in the invention they are fed not directly but rather via the event dispatcher 11. The rules may be read by AMIT and the event dispatcher simultaneously. The event dispatcher 11 first feeds the events to the event concurrency control unit 12 and only then feeds them to the event processing unit 13 in response to initiation control information received from the event concurrency control unit 12. The time-stamp information associated with each event may be derived by an internal clock (not shown) or by a pre-defined running order associated with each event. The event dispatcher 11 in conjunction with the event concurrency control unit 12 operates as an event receiver and conveyor 15 that processes incoming events so as to determine when their processing may be started according to known dependencies and then dispatches them to an event processing unit 13.

FIG. 1 shows the construction of the event concurrency control unit 12 and the manner in which it is coupled to the event processing unit 13. In practice, an essential feature of the invention resides in the ability to run several event processing units concurrently, so in practice the event concurrency control unit 12 has multiple processor output ports each adapted for coupling a respective event processing unit thereto.

Figure 2:
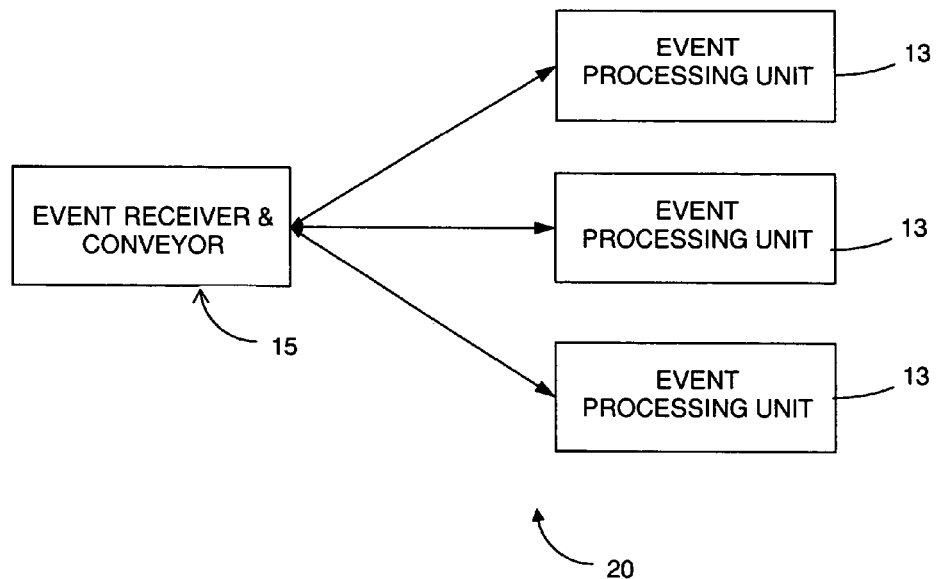
FIG. 2 is a block diagram showing schematically a system according to a second embodiment of the invention for use in a distributed environment.

FIG. 2 is a block diagram showing schematically a system 20 according to such an embodiment of the invention for use in a distributed environment. Components that have already been described with reference to FIG. 1 will be identified by the same reference numerals. Thus, in the system 20 the event receiver and conveyor 15 is coupled to multiple event processing units, each of which is designated 13 and may be realized by the AMIT engine. Incoming events are processed by the event receiver and conveyor 15 as described above with reference to FIG. 1 so as to determine when they may be initiated. They may then be dispatched to different event processing units 13 for concurrent processing although the manner in which this is done and the manner in which different processors are selected are not themselves features of the invention.

Having described possible implementations of a system according to the invention, the manner in which the timestamp based concurrency control algorithm operates will now be described.

A dependency graph among all events and situations in the system is created. The dependency graph may be constructed based on analysis of the metadata (rules definitions) that are normally fed as direct input to the event processing units 13 but in the invention are fed thereto indirectly via the event receiver and conveyor 15. For the purpose of implementing the invention, it is assumed that as part of the rules definitions the following data structures are maintained for each event:

List of situations to which this event should be added;
List of situations for which this event can start their computation window;
List of situations for which this event can close their computation window;
List of situations that can be triggered by this event.

The algorithm according to the invention processes these rules to determine the dependencies between events and situations and between situations and other situations in order to construct data representative of the event/situation hierarchy that includes data indicative of timestamps associated with constituent events. This information is then used to determine whether an event can legitimately have started or is dependent on the completion of a related event before it can start. Within this context, it will be understood that a situation is merely one kind of event that is caused by an event or a combination of events. Therefore, no distinction is made between the term "event" and "situation" so far as the algorithm is concerned.

The algorithm allows optimistic processing of events whereby events are processed concurrently by distributed processors, rather than sequentially as is done conventionally, so as to allow for the possibility that a later event can commence processing without the need to wait for earlier events to commit so as not to delay processing of a later event that is not time-dependent on the earlier event. On the other hand, if it is determined from the event hierarchy that the later event cannot be resolved pending the completion of an earlier event, then the later event will be aborted until the earlier event on whose completion it is time-dependent has terminated.

The algorithm according to the invention processes the event data as will be explained below so as to extract the time dependencies between events. In order to explain how this is done in a manner that will be more intuitive, the event hierarchy will be represented graphically. But it is to be understood that, in practice, what is important is the information implicit in the graphical representation and since the information is anyway inherent in the event data, the algorithm need not actually produce any graphical representation of the event hierarchy. Thus, the following rules are applied in order to construct the event hierarchy graphically:

If an event or situation participates in a situation as an operand, then an edge is added from the event/situation node to the situation node.

If an event or situation acts as the start or end of a computation window, then the corresponding start/end edge is added from the event/situation node to the situation.

A concurrency control table is created, wherein a separate column is defined for each situation definition. If there is an edge from an event to the situation associated with a column of interest in the dependency graph, then the event is added to the column. Each column is sorted by an event's arrival timestamp.

Events are added to appropriate columns in the concurrency control table with their arrival timestamp. All situations that can be triggered by a particular event are added to appropriate columns in the concurrency control table, with a mark that indicates that those situations are still pending. In the examples described below, the mark is denoted by an asterisk (*). For events that act as an end of a computation window, a special mark is added in order to take care of deferred/delayed situations. In the examples described below, the path from such events to a dependent situation is marked as "End Edge." In similar manner, the path from events that act as a start of a computation window to a dependent situation is marked as "Start Edge." This allows the algorithm to identify start and end dependencies of computation windows relating to dependent situations.

An event transaction should start, if it is placed first among "real" events (not marked situations) in all the columns of the concurrency control table. The event transaction will be committed only if it is placed first in all the columns of the concurrency control table (among all events and marked situations in the table). In the case that there is a regular event and an event that acts as an end of the computation window, with the same timestamps (in the case of deferred/delayed situations) the event will start the new transaction. When an event transaction with a timestamp t2 attempts to commit, the algorithm checks if any marked situation having a timestamp t1 (t1<t2) became real (the mark was removed). In such case, the later event transaction is aborted and re-started.

If there is a situation with such timestamp that is still marked, the transaction processing will be blocked till the marked situation is resolved (removed or changed to real).

Figure 3:
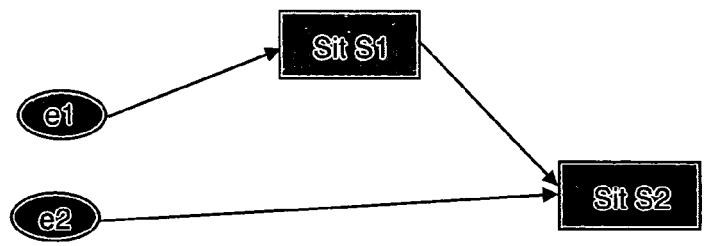
FIGS. 3, 4 and 5 show dependency graphs describing dependencies between events and situations according to different examples according to the invention.
Figure 4:
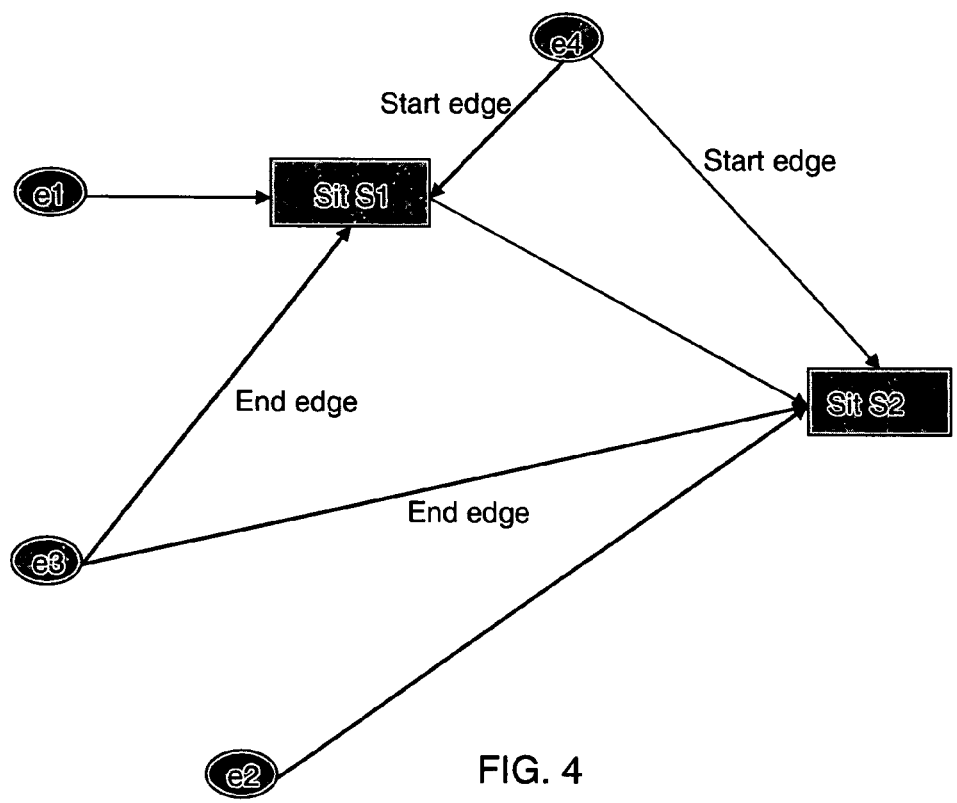

Different examples will now be described with reference to FIGS. 3 to 5 of the drawings. FIG. 3 refers to the simple case of dependencies, where the first event leads to the detection of a situation, and the detected situation participates in other situation detection together with a second event. FIG. 4 illustrates the case, where incoming events can also close the computational window for detecting situations and FIG. 5 refers to the case, where detected situations reported only at the end of computational window period, but still should be taken into the account for other situations detections.

EXAMPLE 1

FIG. 3 shows graphically a situation S1 that is a composite function of e1, and a situation S2 that is a composite of S1 and e2. It is assumed that the event transactions are partially ordered, implying that the order or sequence in which events are committed is important. The computation windows for both situations are started at startup and never ended.

The Scenario:

Event e1 arrives at t1, event e2 arrives at t2 (t2>t1). The concurrency control table for S1 and S2 will be:

| S1 | S2 |
|---|---|
| e1;t1 | s1;t1* |
|  | e2;t2 |

So far as situation S2 is concerned, S1 is a constituent event that must complete (i.e. commit) before situation S2 can occur. However, S1 is also dependent on the event e1 committing. This means that so far as situation S2 is concerned, the event s1 is unresolved at time t1 and so is marked. Both e1 and e2 will start transactions concurrently. If s1 is triggered, e2 will abort its transaction and will redo its work. This ensures that ordering of transactions is maintained if S2 is a sequence of (S1, e2) indicating that S1 must commit before e2 commits and that only then can S2 be resolved. On the other hand, there may be scenarios where S1 does not occur and is deleted from the concurrency control table. For example, S1 might be the situation "bank account is overdrawn" and e1 being the event spawning this situation might simply be a customer's current balance. Thus, if by the time e2 has committed, e1 arrives and is a healthy balance, S1 will not be triggered and can be deleted from the concurrency control table. This can happen for definitions that require only one event in order to trigger a situation. For instance S2 may be defined to be triggered if one of two events arrives (S1 or e2). Consider, for example, that S2 denotes the situation "account problem" and e2 indicates that "credit card is cancelled." So in this case if S1 is not triggered then e2 will not be rolled back and S2 will be detected. This allows the event dispatcher 11 to dispatch the event transactions e1 and e2 to different processors so as to allow parallel processing thereby saving time.

EXAMPLE 2

FIG. 4 shows graphically a situation S1 that is a composite function of e1. Situation S2 is a composite function of S1 and e2. Thus far, the event hierarchy is the same as that described above with reference to FIG. 3. However, while all situations occur in specific computation windows, in previous cases the computation windows were unlimited and extended from startup without termination, the situations shown in FIG. 4 are constrained to occur within computation windows that commence after startup and have predetermined terminators. These are shown graphically as start or end edges associated with an event that indicate that a situation spawned by that event is constrained to occur with a computation window that either starts or ends concurrently with the event, depending on whether the edge is a start edge or an end edge, respectively. Thus, event e3 ends a computation window for both S1 and S2 meaning that when e3 occurs, computation of both S1 and S2 ends. On the other hand, the computation windows of S1 and S2 are both started on arrival of e4. Thus, the computation windows for both S1 and S2 extend from the time associated with e4 to the time associated with e3. This means that if e3 arrives before e4, it has no influence on S1 because its computation window is not started yet since S1 would need to be computed before its computation starts. Event e4 still determines that computation of S1 can commence and it completes when the computational window is closed by e3. Event e4 starts the computation window, but S1 will be detected as soon as suitable after arrival of event e1 (commensurate with the threshold conditions if there are any). Thus, when e4 arrives it will start the computation window of S1, and the next e1 event that arrives (but before e3) will be computed. By way of example, e4 may be a "day start" event and e3 a "day end" event. S1 may be "bank account is overdrawn", event e1 indicating the "account balance". Event e2 may be "Request for payment" and S2 could be "Payment Failed", so that "Payment Failed" will be detected if in the same business day the "Request for payment" and "account overdrawn" are received.

The Scenario:

Event e4 arrives at t1, event e1 at t2, event e3 at t3 and event e2 at t4, where t1<t2<t3<t4.

In this case the concurrency control table will contain:

| S1 | S2 |
|---|---|
| e4start;t1 | e4start;t1 |
| e1;t2 | s1;t2* |
| e3end;t3 | e3end;t3 |
| | e2;t4 |

In this case the processing will be sequential, because e3 cannot start before e1 (S1), and e2 cannot start before e3 (S2).

Closing a Computation Window

If an event closes the computation window, the transaction will start only if it placed first among all events (both real and those "marked situations" which are processed optimistically but may need later to be aborted and re-run), and will be committed for each situation separately (partial commit). After partial commitment, other transactions may start for the committed situation. Also after the closing computation window for a situation, the method checks if delayed/deferred situations were triggered and were written in the table before the event that closes the window (with same timestamp). This will occur in the case of deferred/delayed situations that are needed in other situations whose computational windows are closed by the same event.

EXAMPLE 3

Figure 5:
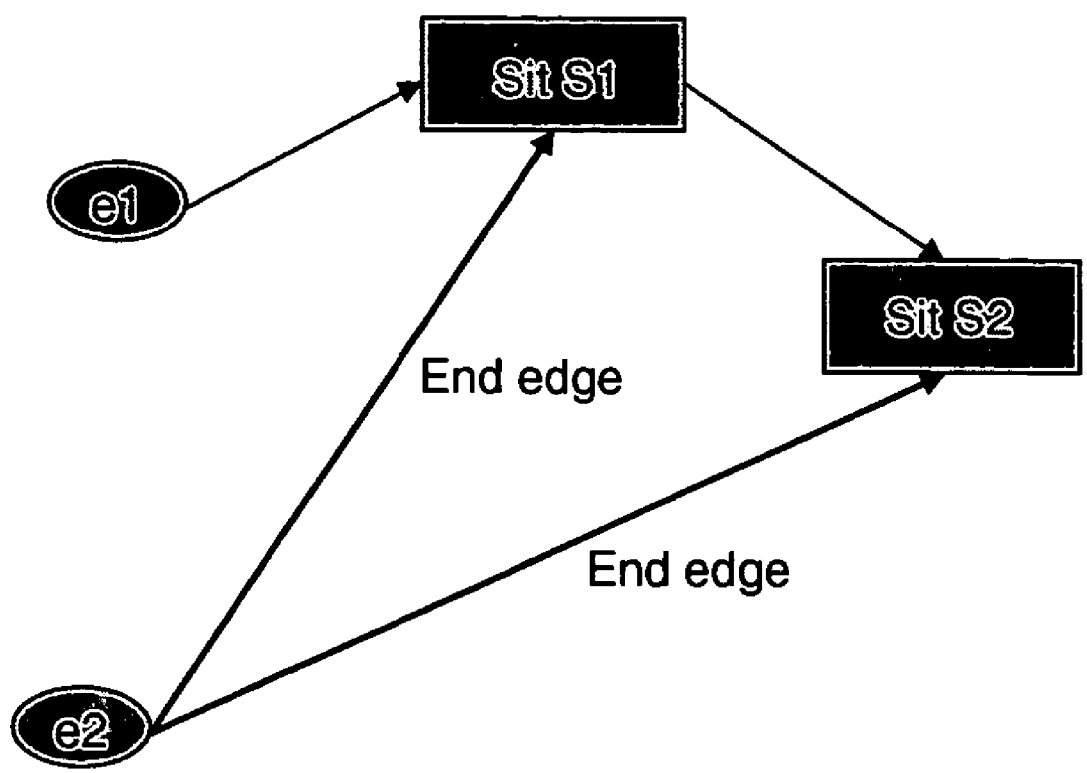

FIG. 5 shows graphically a deferred situation S1 that is a composite function of e1. Situation S2 is a composite function of S1. Thus here also, the event hierarchy is the same as that described above with reference to FIG. 3. However, computation windows for both situations are started at startup and ended on arrival of event e2.

The Scenario:

Event e1 arrives at t1, e2 arrives at t2 (t1<t2).

In this case the concurrency control table will contain:

| S1 | S2 |
|---|---|
| e1;t1 | s1*;t2 |
| e2end;t2 | e2end;t2 |

Situation s1 is not written with timestamp t1 because only e2 can trigger S1 (deferred situation). S1 must be committed within a computation window that ends with the arrival of e2. Thus, when e2 arrives, computation of S1 stops, i.e. its computation window closes. The computation of S1 is executed when e2 arrives, i.e. since S1 is a deferred situation, its computation is deferred until e2 arrives. The actual computation is done on e1 events that arrived before e2.

When e2 arrives and starts its process, the computation of S1 ends. If S1 is now detected, implying that the situation has occurred, then S1:t1 is written to the concurrency control table and e2 will suspend its processing, and will resume its processing only after S1's process is completed. This allows computation of deferred situations that are a part of AMIT language, for example.

An example of a deferred situation is a NOT situation. For example, suppose situation S1 is defined as NOT(e1). In this case S1 will be detected if e1 does not arrive before e2. Event e1 will be as before the "account balance" situation S1 will be "Average Balance" and will be defined as Report (e1). This situation will calculate the maximal balance till event e2 is received, and it will be triggered on arrival of e2. Situation S2 will be "Good Day" and it will be triggered if the average balance calculated by S1 is greater than a certain amount.

Figure 6:
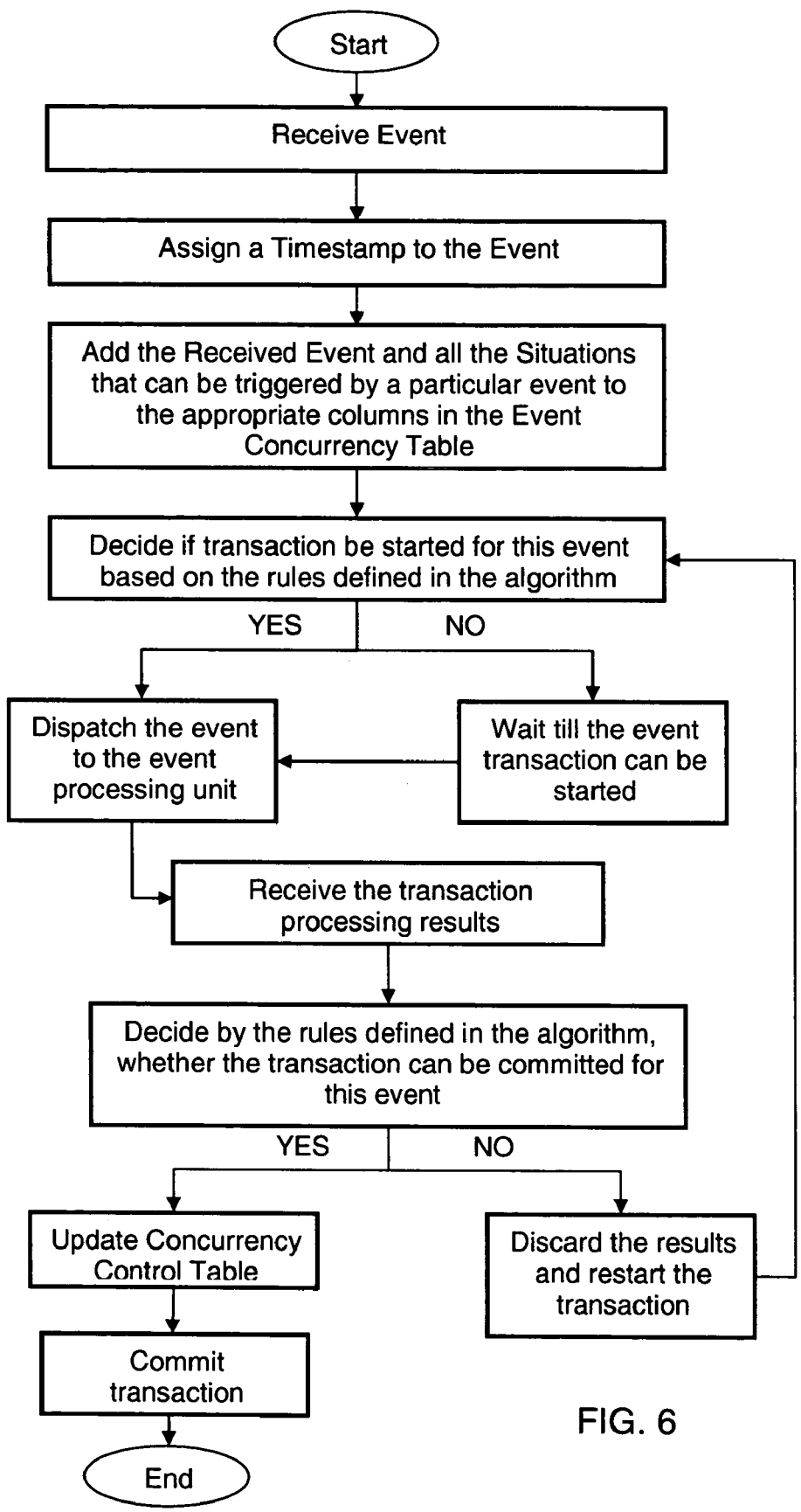
FIG. 6 is a flow diagram showing the principal actions carried out by an event receiver and conveyor according to the invention.

FIG. 6 is a flow diagram summarizing the principal actions carried out by the event receiver and conveyor 15 shown in FIGS. 1 and 2. Thus, on receiving an event, the event receiver and conveyor 15 assigns a timestamp to the event and adds the received event and all the situations that can be triggered thereby to the appropriate columns in the event concurrency table. It then decides in accordance with predetermined rules whether the transaction can be started for this event. If not, the event receiver and conveyor 15 waits until the event transaction can be started. If and when the event transaction can be started, the event receiver and conveyor 15 dispatches the event to the event processing unit 13 from which it then receives the transaction processing results. It then decides in accordance with the predetermined rules, whether the transaction can be committed for this event. If not, it discards the results and restarts the transaction. If so, it updates the event concurrency table and commits the results. It should be noted that the selection of a processor is not a part of the invention. Any suitable existing clustering mechanism can be used. For example in the case of a WebSphere Aplication Server based solution, then a WebSphere cluster may be used, and the processor will be chosen by its load balancing mechanism.

Figure 7:
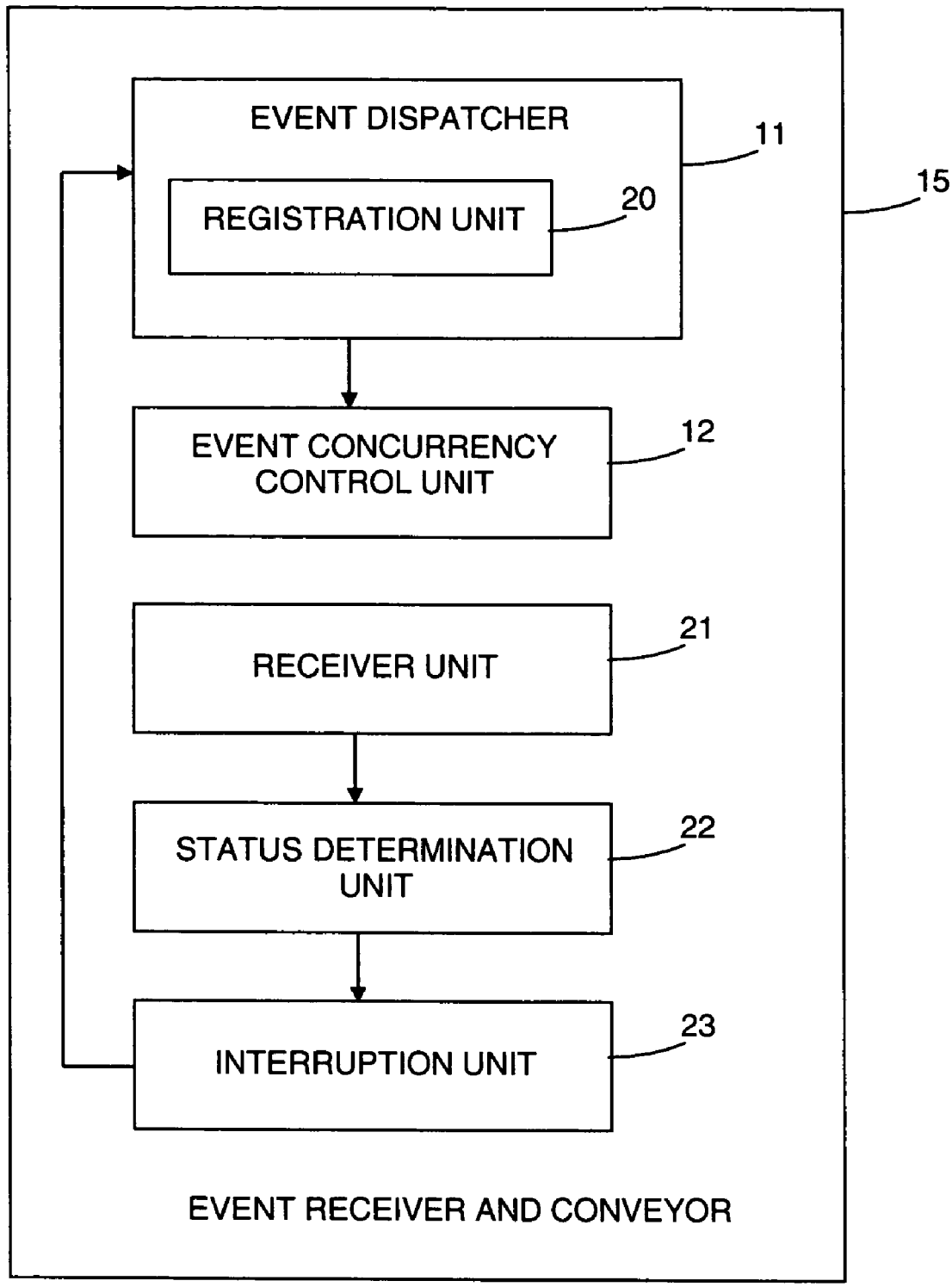
FIG. 7 is a block diagram showing functionally in greater detail the event receiver and conveyor depicted in FIG. 1.

FIG. 7 is a block diagram showing functionally in greater detail an event receiver and conveyor 15 comprising an event dispatcher 11 for receiving one or more events. An event concurrency control unit 12 is coupled to the event dispatcher and is responsive to respective time stamps associated with the events for resolving possible time dependencies among events according to the associated event rules. The time stamps may either be prior associated with the respective events before they arrive or, alternatively, time stamps may be assigned to the events by the event receiver and conveyor 15 on arrival. The event dispatcher 11 includes a registration unit 20 for registering each incoming event so as to maintain a list of registered events and is adapted to dispatch each event transaction for which all dependencies are resolved to an event processing unit 15, thus allowing parallel execution of events, according to dependencies that are learned from event rule definitions associated with the events. The event concurrency control unit is configured to resolve possible time dependencies for each registered event with registered events and also with marked situations that are not detected yet according to the predetermined event rules.

The event receiver and conveyor 15 further includes a receiver unit 21 for receiving a processing result of the event transaction and a status determination unit 22 coupled to the receiver unit 21 for determining whether the event transaction is to be committed or aborted. An interruption unit 23 coupled to the status determination unit is responsive to a status that indicates that the event transaction is to be aborted, for aborting the event transaction. The event dispatcher 11 is coupled to the interruption unit for dispatching the event transaction again to a processing unit. The processing unit may be the same as the processing unit or may be a different processing unit.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer implemented method for scheduling event transactions, each event transaction having a respective time stamp for use in an event-driven application having predetermined event rules, said method comprising:

resolving possible time dependencies among events according to said predetermined event rules; and determining when the event transactions are processed thus allowing the event transactions to be dispatched to distributed processors for concurrent processing, wherein said determining when the event transactions are processed comprises:

registering each incoming event to maintain a list of registered events;

for each registered event resolving possible time dependencies among registered events with marked situations that are not detected yet according to said predetermined event rules;

dispatching an event transaction for which all said possible time dependencies are resolved to an event processing unit;

receiving a processing result of the event transaction; determining whether said event transaction is to be committed or aborted;

if the event transaction is to be aborted, aborting the event transaction and dispatching the event transaction again to a processing unit; and wherein said registering each incoming event includes:

receiving an event; assigning a timestamp to the event;

determining using predetermined event rules and the marked situations that can be triggered by the received event;

adding the received event and the marked situations that can be triggered thereby to appropriate columns in an event concurrency table;

determining in accordance with said predetermined event rules whether a transaction spawned by the received event can be started for the received event;

if the transaction cannot be started for the received event, waiting until the transaction can be started;

if the transaction can be started: dispatching the event to the event processing unit;

receiving transaction processing results from the event processing unit; determining in accordance with the predetermined event rules, whether the transaction can be committed for the received event;

if the transaction cannot be committed for the received event, discarding the processing results and restarting the transaction; and if the transaction can be committed for the received event, updating the event concurrency table and committing the transaction.

* * * * *